United States Patent
Xu et al.

(10) Patent No.: US 10,721,663 B2
(45) Date of Patent: Jul. 21, 2020

(54) MOBILITY MANAGEMENT METHOD AND DEVICE

(71) Applicant: China Mobile Communications Corporation, Beijing (CN)

(72) Inventors: Xiaodong Xu, Beijing (CN); Qiuxiang Li, Beijing (CN); Wenli Qin, Beijing (CN); Tingting Liu, Beijing (CN); Nan Hu, Beijing (CN); Zhuo Chen, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days.

(21) Appl. No.: 15/549,311

(22) PCT Filed: Dec. 31, 2015

(86) PCT No.: PCT/CN2015/100119
§ 371 (c)(1),
(2) Date: Aug. 7, 2017

(87) PCT Pub. No.: WO2016/124056
PCT Pub. Date: Aug. 11, 2016

(65) Prior Publication Data
US 2018/0035349 A1    Feb. 1, 2018

(30) Foreign Application Priority Data

Feb. 6, 2015   (CN) .......................... 2015 1 0065211

(51) Int. Cl.
*H04W 36/08*   (2009.01)
*H04W 36/06*   (2009.01)
(Continued)

(52) U.S. Cl.
CPC ....... *H04W 36/08* (2013.01); *H04W 36/0094* (2013.01); *H04W 36/06* (2013.01); *H04W 36/32* (2013.01); *H04W 48/10* (2013.01)

(58) Field of Classification Search
CPC . H04W 36/0094; H04W 36/08; H04W 36/30; H04W 36/32; H04W 36/0077;
(Continued)

(56) References Cited

U.S. PATENT DOCUMENTS 6,434,389 B1 *  8/2002  Meskanen ............. H04W 48/20
                                                    455/436
7,187,934 B2 *  3/2007  Turina .................. H04W 16/06
                                                    455/453
(Continued)

FOREIGN PATENT DOCUMENTS

CN    101459943 A    6/2009
CN    101742549 A    6/2010
(Continued)

OTHER PUBLICATIONS

International Search Report dated Mar. 24, 2016 issued in International Application No. PCT/CN2015/100119.
(Continued)

*Primary Examiner* — Magdi Elhag
(74) *Attorney, Agent, or Firm* — Mintz Levin Cohn Ferris Glovsky and Popeo, P.C.; Steven M. Jensen (57) ABSTRACT

The disclosure provides a mobility management method and device. The mobility management method includes: obtaining a frequency specific minimum receiving level value Qrxlevmin of each neighbor cell of a serving cell, a pre-configured Cell specific minimum receiving level value Qrxlevmin-offset of each neighbor cell, and a signal level value of each neighbor cell; calculating a sum value of the frequency specific minimum receiving level value Qrx-
(Continued)

levmin and the Cell specific minimum receiving level value Qrxlevmin-offset of any neighbor cell; and taking a cell with a signal level value larger than the sum value of the frequency specific minimum receiving level value Qrxlevmin and the Cell specific minimum receiving level value Qrxlevmin-offset as a candidate target cell.

6 Claims, 3 Drawing Sheets

(51) Int. Cl.
  *H04W 36/00* (2009.01)
  *H04W 36/32* (2009.01)
  *H04W 48/10* (2009.01)
(58) Field of Classification Search
  CPC ............. H04W 36/18; H04W 36/0005; H04W 36/0083; H04W 48/10; H04W 48/20
  See application file for complete search history.

(56) References Cited

U.S. PATENT DOCUMENTS

| | | | |
|---|---|---|---|
| 9,271,212 B1* | 2/2016 | Hou | H04W 36/22 |
| 9,554,367 B1* | 1/2017 | Liu | H04W 36/16 |
| 2010/0297955 A1* | 11/2010 | Marinier | H04W 36/0061 455/73 |
| 2011/0064059 A1* | 3/2011 | Hooli | H04W 36/24 370/332 |
| 2011/0263262 A1* | 10/2011 | Min | H04W 36/0083 455/438 |
| 2014/0004862 A1* | 1/2014 | Ekemark | H04W 72/06 455/443 |
| 2014/0050200 A1 | 2/2014 | Lee | |
| 2014/0211763 A1 | 7/2014 | Choi et al. | |
| 2014/0295851 A1* | 10/2014 | Kubota | H04W 36/0083 455/441 |
| 2014/0341059 A1 | 11/2014 | Jang et al. | |
| 2016/0080990 A1* | 3/2016 | Thiruvenkatachari | H04W 36/0083 370/312 |
| 2016/0112926 A1 | 4/2016 | Lee | |
| 2016/0374000 A1* | 12/2016 | Kim | H04W 48/20 |

FOREIGN PATENT DOCUMENTS

| | | | |
|---|---|---|---|
| CN | 101965058 A | | 2/2011 |
| CN | 103428748 A | | 12/2013 |
| CN | 103945466 | * | 7/2014 |
| CN | 103945466 A | | 7/2014 |

OTHER PUBLICATIONS

English Translation of Written Opinion dated Mar. 24, 2016, issued in International Application No. PCT/CN2015/100119.
Supplementary European Search Report in European application No. 15880997.0, dated May 18, 2018.
"3rd Generation Partnership Project: Technical Specification Group Radio Access Network: Evolved Universal Terrestrial Radio Acess (E-UTRA); Radio Resource Control (RRC); Protocol specification (Release 12)", 3GPP Standard; 3GPP TS 36.331, 3rd Generation Partnership Project (3GPP), Mobile Competence Centre; 650, Route Des Lucioles; F-06921 Sophia-Antipolis Cedec; France, vol. RAN WG2, No. V12.4.1, Jan. 7, 2015 (Jan. 7, 2015), pp. 1-410, XP050927575.
3GPP TS 36.331 V9.18.0, Technical Specification Group Radio Access Network, issued on Jun. 1, 2014.
3GPP TSG-RAN WG2 Meeting #103, R2-1812989, Gothenburg, Sweden, issued on Aug. 20-24, 2018.
3GPP TS 36.331 V9.3.0, Technical Specification Group Radio Access Network, issued on Jun. 2010.
3GPP TS 36.304 V9.3.0, Technical Specification Group Radio Access Network, issued on Jun. 2010.
Second Office Action of European application No. 15880997.0, dated Sep. 12, 2019.
3rd Generation Partnership Project; Technical Specification Group Radio Access Network; Evolved Universal Terrestrial Radio Access (E-UTRA) and Evolved Packet Core (EPC); Users Equipment (UE) conformance specification; Part 1:Protocol conformance specification (Release 12), 3GPP Standard; 3GPP TS 36.523-1, 3RD Generation Partnership Project (3GPP), Mobile Competence Centre ; 650, Route Des Lucioles ;F-06921 Sophia-Antipolis Cedex ; France, vol. RAN WG5 , No. V12.4.0, Jan. 6, 2015.

* cited by examiner

MOBILITY MANAGEMENT METHOD AND DEVICE

CROSS-REFERENCES TO RELATED APPLICATIONS

This application is a U.S. national phase application, pursuant to 35 U.S.C. § 371, of PCT/CN2015/100119, filed Dec. 31, 2015, designating the United States, which claims priority to Chinese Application No. 201510065211.8, filed Feb. 6, 2015. The entire contents of the aforementioned patent applications are incorporated herein by reference.

TECHNICAL FIELD

The disclosure relates to the technical field of wireless communications, and in particular to a mobility management method and device.

BACKGROUND

Mobility management can assist a Long Term Evolution (LTE) communication system in implementing load balancing, providing a better user experience and improving the entire performance of the system.

For convenience of elaboration, a cell serving a terminal currently, namely a cell on which the terminal camps currently, is referred to as a serving cell, and a cell selected or reselected by the terminal is referred to as a target cell. Mobility management functions are mainly divided into two classes: idle mode mobility management and connected mode mobility management, where the idle mode mobility management is mainly self-decided by the terminal on the basis of static parameters configured by a network, and the connected mode mobility management is mainly decided by the network side on the basis of a measurement report of the terminal.

In the idle mode mobility management, the terminal needs to decide, with reference to a minimum receiving level value (expressed as Qrxlevmin) configured by a cell, whether the current cell is a cell suitable to be camped on. In a cell selection stage, if a current signal level value of the terminal is higher than the Qrxlevmin of a certain cell, the terminal will take this cell as a target cell to be camped on. In a cell reselection stage, the terminal firstly sorts measured signal intensity values of neighbor cells which satisfy camp conditions or function values adopting the signal intensity values as variables, then takes a cell with a maximum signal level value or equivalent parameter value of the signal level value as a target cell according to a sorted result, and finally camps on the reselected cell. In this manner, during cell selection, the terminal may make ping-pong reselection between two or more cells due to the fact that the Qrxlevmin of the target cell is higher than a frequency specific Qrxlevmin deployed, in the current cell, for this cell.

In the connected mode mobility management, during selection of a target cell, the target cell is determined only on the basis of a signal level value, reported by the terminal, of a current serving cell, a signal level, measured by the terminal, of a neighbor cell, and resources of the neighbor cell. However, in this manner, a target handover cell selected by the network side cannot totally ensure that the terminal can normally complete random access and other uplink procedures after accessing the cell. Therefore, the effectiveness of cell selection is poor.

To sum up, when cell reselection is made in the current mobility management, the terminal may make ping-pong reselection between two or more cells or the terminal may fail in camping on a cell, or the effectiveness is poor when cell selection is made in handover decision of a current serving cell.

SUMMARY

The disclosure provides a mobility management method and device, which can solve the problems that a terminal may make ping-pong reselection between two or more cells or the terminal may fail in camping on a cell when cell reselection is made in current mobility management or the effectiveness is poor when cell selection is made in handover decision of a current serving cell.

The disclosure provides a mobility management method, which includes:

obtaining a frequency specific minimum receiving level value Qrxlevmin of each neighbor cell of a serving cell, a pre-configured Cell specific minimum receiving level value Qrxlevmin-offset of each neighbor cell, and a signal level value of each neighbor cell;

calculating a sum value of the frequency specific minimum receiving level value Qrxlevmin and the Cell specific minimum receiving level value Qrxlevmin-offset of any neighbor cell; and taking a cell with a signal level value larger than the sum value of the frequency specific minimum receiving level value Qrxlevmin and the Cell specific minimum receiving level value Qrxlevmin-offset as a candidate target cell.

Optionally, obtaining a signal level value of each neighbor cell includes:

measuring a frequency of a system broadcast message, and determining a signal level value of each neighbor cell.

The disclosure provides a mobility management method, which includes:

obtaining a pre-configured Cell specific minimum receiving level value Qrxlevmin-offset of each neighbor cell; and broadcasting the pre-configured Cell specific minimum receiving level value Qrxlevmin-offset of each neighbor cell.

The disclosure provides a mobility management method, which includes:

receiving a signal level value of a candidate target cell from a terminal;

obtaining a frequency specific minimum receiving level value Qrxlevmin of the candidate target cell and a pre-configured Cell specific minimum receiving level value Qrxlevmin-offset of the candidate target cell;

calculating a sum value of the frequency specific minimum receiving level value Qrxlevmin and the Cell specific minimum receiving level value Qrxlevmin-offset of any candidate target cell; and taking a candidate target cell with a signal level value larger than the sum value of the frequency specific minimum receiving level value Qrxlevmin and the Cell specific minimum receiving level value Qrxlevmin-offset as a target cell.

Optionally, the mobility management method further includes:

sending, to the terminal, a handover instruction for handover to the selected target cell.

Optionally, obtaining a pre-configured Cell specific minimum receiving level value Qrxlevmin-offset of the candidate target cell includes:

obtaining a pre-configured Cell specific minimum receiving level value Qrxlevmin-offset of the candidate target cell by interaction with the neighbor cells; or obtaining a pre-configured Cell specific minimum receiving level value Qrxlevmin-offset of the candidate target cell in pre-stored pre-configured Cell specific minimum receiving level values Qrxlevmin-offset of the neighbor cells.

The disclosure provides a mobility management method, which includes:

determining a candidate target cell according to an obtained signal level value of each neighbor cell of a serving cell;

reporting a measurement result of the candidate target cell, the measurement result including a signal level value of a target cell;

receiving a handover instruction for handover to the target cell, the target cell being determined by the serving cell according to a sum value of a reported signal level value of the candidate target cell, and a pre-configured frequency specific minimum receiving level value Qrxlevmin and Cell specific minimum receiving level value Qrxlevmin-offset of the candidate target cell; and performing handover to the target cell according to the handover instruction.

Optionally, obtaining a signal level value of each neighbor cell of a serving cell includes:

measuring a measurement object configured for each neighbor cell of the serving cell, and obtaining a signal level value of each neighbor cell of the serving cell.

The disclosure provides a mobility management device, which includes:

an obtaining module, configured to obtain a frequency specific minimum receiving level value Qrxlevmin of each neighbor cell of a serving cell, a pre-configured Cell specific minimum receiving level value Qrxlevmin-offset of each neighbor cell, and a signal level value of each neighbor cell;

a calculating module, configured to calculate a sum value of the frequency specific minimum receiving level value Qrxlevmin and the Cell specific minimum receiving level value Qrxlevmin-offset of any neighbor cell; and a determining module, configured to take a cell with a signal level value larger than the sum value of the frequency specific minimum receiving level value Qrxlevmin and the Cell specific minimum receiving level value Qrxlevmin-offset as a candidate target cell.

Optionally, the obtaining module is specifically configured to measure a frequency of a system broadcast message, and determine a signal level value of each neighbor cell.

The disclosure provides a mobility management device, which includes:

an obtaining module, configured to obtain a Cell specific minimum receiving level value Qrxlevmin-offset pre-configured for each neighbor cell; and a sending module, configured to broadcast the pre-configured Cell specific minimum receiving level value Qrxlevmin-offset of each neighbor cell.

The disclosure provides a mobility management device, which includes:

a receiving module, configured to receive a signal level value of a candidate target cell from a terminal;

an obtaining module, configured to obtain a frequency specific minimum receiving level value Qrxlevmin of the candidate target cell and a pre-configured Cell specific minimum receiving level value Qrxlevmin-offset of the candidate target cell;

a calculating module, configured to calculate a sum value of the frequency specific minimum receiving level value Qrxlevmin and the Cell specific minimum receiving level value Qrxlevmin-offset of any candidate target cell; and a selecting module, configured to take a candidate target cell with a signal level value larger than the sum value of the frequency specific minimum receiving level value Qrxlevmin and the Cell specific minimum receiving level value Qrxlevmin-offset as a target cell.

Optionally, the mobility management device further includes:

a sending module, configured to send, to the terminal, a handover instruction for handover to the selected target cell.

Optionally, the obtaining module is specifically configured to: obtain a pre-configured Cell specific minimum receiving level value Qrxlevmin-offset of the candidate target cell by interaction with the neighbor cells; or obtain a pre-configured Cell specific minimum receiving level value Qrxlevmin-offset of the candidate target cell in pre-stored pre-configured Cell specific minimum receiving level values Qrxlevmin-offset of the neighbor cells.

The disclosure provides a mobility management device, which includes:

a determining module, configured to determine a candidate target cell according to an obtained signal level value of each neighbor cell of a serving cell;

a reporting module, configured to report a measurement result of the candidate target cell, the measurement result including a signal level value of a target cell;

a receiving module, configured to receive a handover instruction for handover to the target cell, the target cell being determined by the serving cell according to a sum value of a reported signal level value of the candidate target cell, and a pre-configured frequency specific minimum receiving level value Qrxlevmin and Cell specific minimum receiving level value Qrxlevmin-offset of the candidate target cell; and an access module, configured to perform handover to the target cell according to the handover instruction.

Optionally, the determining module is further configured to measure a measurement object configured for each neighbor cell of the serving cell, and determine a signal level value of each neighbor cell of the serving cell.

The disclosure provides a mobility management device, which includes one or more processors and a storage medium storing computer-readable operation instructions. When the computer-readable operation instructions in the storage medium are run, the processor executes the following steps:

obtaining a frequency specific minimum receiving level value Qrxlevmin of each neighbor cell of a serving cell, a pre-configured Cell specific minimum receiving level value Qrxlevmin-offset of each neighbor cell, and a signal level value of each neighbor cell;

calculating a sum value of the frequency specific minimum receiving level value Qrxlevmin and the Cell specific minimum receiving level value Qrxlevmin-offset of any neighbor cell; and taking a cell with a signal level value larger than the sum value of the frequency specific minimum receiving level value Qrxlevmin and the Cell specific minimum receiving level value Qrxlevmin-offset as a candidate target cell.

The disclosure provides a mobility management device, which includes one or more processors and a storage medium storing computer-readable operation instructions. When the computer-readable operation instructions in the storage medium are run, the processor executes the following steps:

obtaining a pre-configured Cell specific minimum receiving level value Qrxlevmin-offset of each neighbor cell; and broadcasting the pre-configured Cell specific minimum receiving level value Qrxlevmin-offset pf each neighbor cell.

The disclosure provides a mobility management device, which includes one or more processors and a storage medium storing computer-readable operation instructions. When the computer-readable operation instructions in the storage medium are run, the processor executes the following steps:

receiving a signal level value of a candidate target cell from a terminal;

obtaining a frequency specific minimum receiving level value Qrxlevmin of the candidate target cell and a pre-configured Cell specific minimum receiving level value Qrxlevmin-offset of the candidate target cell;

calculating a sum value of the frequency specific minimum receiving level value Qrxlevmin and the Cell specific minimum receiving level value Qrxlevmin-offset of any candidate target cell; and taking a candidate target cell with a signal level value larger than the sum value of the frequency specific minimum receiving level value Qrxlevmin and the Cell specific minimum receiving level value Qrxlevmin-offset as a target cell.

The disclosure provides a mobility management device, which includes one or more processors and a storage medium storing computer-readable operation instructions. When the computer-readable operation instructions in the storage medium are run, the processor executes the following steps:

determining a candidate target cell according to an obtained signal level value of each neighbor cell of a serving cell;

reporting a measurement result of the candidate target cell, the measurement result including a signal level value of a target cell;

receiving a handover instruction for handover to the target cell, the target cell being determined by the serving cell according to a sum value of a reported signal level value of the candidate target cell, and a pre-configured frequency specific minimum receiving level value Qrxlevmin and Cell specific minimum receiving level value Qrxlevmin-offset of the candidate target cell; and performing handover to the target cell according to the handover instruction.

By means of the above-mentioned technical solution, each cell introduces a pre-configured Cell specific minimum receiving level value Qrxlevmin-offset. In mobility management, during cell selection, a final target cell is obtained by overall consideration of introduction of a sum value of a frequency specific minimum receiving level value Qrxlevmin and a Cell specific minimum receiving level value Qrxlevmin-offset. In this way, the following problems can be solved: a terminal may make ping-pong reselection between two or more cells or the terminal may fail in camping on a cell when cell reselection is made in current mobility management or the effectiveness is poor when cell selection is made in handover decision of a current serving cell.

DETAILED DESCRIPTION

In the technical solution provided in the embodiments of the disclosure, each cell introduces a frequency specific minimum receiving level value Qrxlevmin and a Cell specific minimum receiving level value Qrxlevmin-offset. In mobility management, during cell selection, a final target cell is obtained by overall consideration of introduction of a sum value of the frequency specific minimum receiving level value Qrxlevmin and the Cell specific minimum receiving level value Qrxlevmin-offset. In this way, The following problems can be solved: a terminal may make ping-pong reselection between two or more cells or the terminal may fail in camping on a cell when cell reselection is made in current mobility management or the effectiveness is poor when cell selection is made.

A main implementation principle and a specific implementation manner of the technical solution in the embodiments of the disclosure will be elaborated hereinbelow with reference to each drawing in detail.

Figure 1:
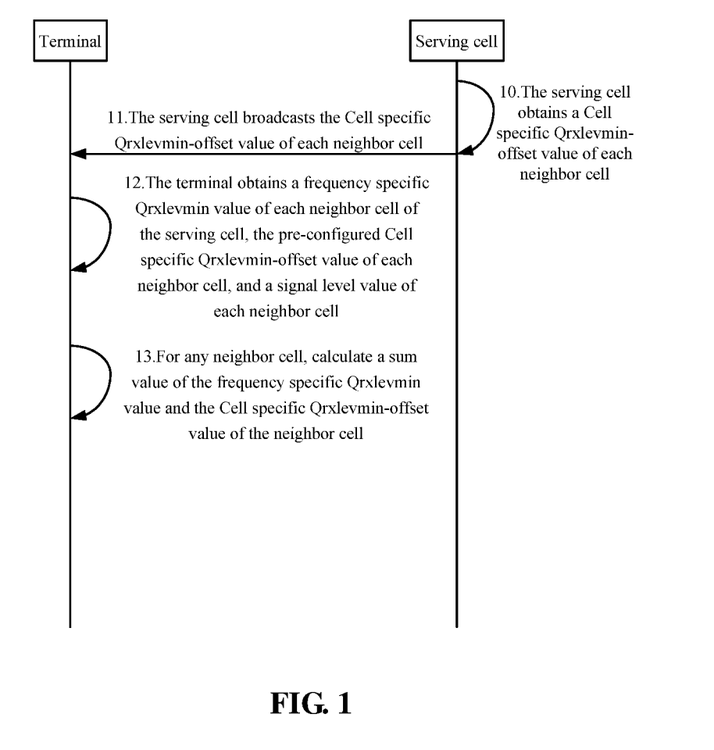
FIG. 1 is a flowchart of a mobility management method according to some embodiments of the disclosure.

In idle mode mobility management, a terminal needs to decide, with reference to a parameter Qrxlevmin value configured by a cell, whether the current cell is suitable for the terminal to camp on. In a current standard definition, the parameter Qrxlevmin value configured by the cell is frequency-specific. Therefore, if the terminal makes cell selection with reference to only the frequency specific minimum receiving level value Qrxlevmin, the terminal may repeatedly select between at least two cells. If the terminal makes cell selection also with reference to a signal level value of the cell, the speed of cell selection will become low. In view of this, some embodiments of the disclosure provide an idle mode mobility management method. As shown in FIG. 1, a specific processing flow thereof is as follows.

In Step 10, a serving cell obtains a pre-configured Cell specific minimum receiving level value Qrxlevmin-offset of each neighbor cell.

In the technical solution provided in the embodiments of the disclosure, a network side configures a frequency specific minimum receiving level value Qrxlevmin for each cell, and pre-configures a Cell specific minimum receiving level value Qrxlevmin-offset for each cell.

Specifically, the following program may be used to implement the technical solution:

| IntraFreqNeighCellInfo ::= | SEQUENCE { |
| physCellId | PhysCellId, |
| q-OffsetCell | Q-OffsetRange, |
| q-RxLevMin-OffsetCell | Q-RxLevMin |
| ... | |
| } | |

The serving cell may store frequency specific minimum receiving level value Qrxlevmins and Cell specific minimum receiving level value Qrxlevmin-offsets of other neighbor cells, and the frequency specific minimum receiving level value Qrxlevmin and Cell specific minimum receiving level value Qrxlevmin-offset of the serving cell per se.

In Step 11, the serving cell broadcasts the Cell specific minimum receiving level value Qrxlevmin-offset of each neighbor cell.

The serving cell may inform a terminal of pre-configured frequency specific minimum receiving level values Qrxlevmin of the neighbor cells in a message broadcasting manner.

In Step 12, the terminal obtains a frequency specific minimum receiving level value Qrxlevmin of each neighbor cell of the serving cell, the pre-configured Cell specific minimum receiving level value Qrxlevmin-offset of each neighbor cell, and a signal level value of each neighbor cell.

The terminal may obtain the frequency specific minimum receiving level value Qrxlevmin of each neighbor cell of the serving cell and the pre-configured Cell specific minimum receiving level value Qrxlevmin-offset of each neighbor cell.

Herein, the terminal may measure a frequency of a system broadcast message, and determine the signal level value of each neighbor cell.

In Step 13, A sum value of the frequency specific minimum receiving level value Qrxlevmin and the Cell specific minimum receiving level value Qrxlevmin-offset of any neighbor cell is calculated.

In some embodiments of the disclosure, at a terminal side, a mobility management method is provided, which includes the steps as follows.

In Step 1, a frequency specific minimum receiving level value Qrxlevmin of each neighbor cell of a serving cell, a pre-configured Cell specific minimum receiving level value Qrxlevmin-offset of each neighbor cell, and a signal level value of each neighbor cell are obtained.

A network side configures a Cell specific minimum receiving level value Qrxlevmin-offset for each cell.

Specifically, the following program may be used to implement the technical solution:

```
IntraFreqNeighCellInfo ::=      SEQUENCE {
    physCellId                      PhysCellId,
    q-OffsetCell                    Q-OffsetRange,
    q-RxLevMin-OffsetCell           Q-RxLevMin
    ...
}
```

The serving cell may store frequency specific minimum receiving level value Qrxlevmins and Cell specific minimum receiving level value Qrxlevmin-offsets of other neighbor cells, and the frequency specific minimum receiving level value Qrxlevmin and Cell specific minimum receiving level value Qrxlevmin-offset of the serving cell per se. The terminal may obtain the frequency specific minimum receiving level value Qrxlevmins and Cell specific minimum receiving level value Qrxlevmin-offset of each neighbor cell of the serving cell from the serving cell.

Herein, the terminal may measure a frequency of a system broadcast message, and determine the signal level value of each neighbor cell.

In Step 2, a sum value of the frequency specific minimum receiving level value Qrxlevmin and the Cell specific minimum receiving level value Qrxlevmin-offset of any neighbor cell is calculated.

In Step 3, a cell with a signal level value larger than the sum value of the frequency specific minimum receiving level value Qrxlevmin and the Cell specific minimum receiving level value Qrxlevmin-offset is taken as a candidate target cell.

Figure 2:
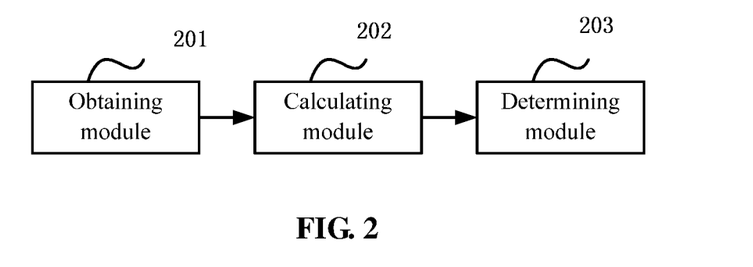
FIG. 2 is a structure composition diagram of a mobility management device according to some embodiments of the disclosure.

In some embodiments of the disclosure, at a terminal side, a mobility management device is provided. As shown in FIG. 2, the mobility management device includes an obtaining module 201, a calculating module 202 and a determining module 203.

The obtaining module 201 is configured to obtain a frequency specific minimum receiving level value Qrxlevmin of each neighbor cell of a serving cell, a pre-configured Cell specific minimum receiving level value Qrxlevmin-offset of each neighbor cell, and a signal level value of each neighbor cell, wherein The obtaining module 201 is specifically configured to measure a frequency of a system broadcast message, and determine a signal level value of each neighbor cell;

The calculating module 202 is configured to calculate a sum value of the frequency specific minimum receiving level value Qrxlevmin and the Cell specific minimum receiving level value Qrxlevmin-offset of any neighbor cell; and The determining module 203 is configured to take a cell with a signal level value larger than the sum value of the frequency specific minimum receiving level value Qrxlevmin and the Cell specific minimum receiving level value Qrxlevmin-offset as a candidate target cell.

In some embodiments of the disclosure, at a network side, a mobility management method is provided, which includes the steps as follows.

In Step 1, a pre-configured Cell specific minimum receiving level value Qrxlevmin-offset of each neighbor cell is obtained.

In Step 2, the pre-configured Cell specific minimum receiving level value Qrxlevmin-offset of each neighbor cell is broadcast.

Figure 3:
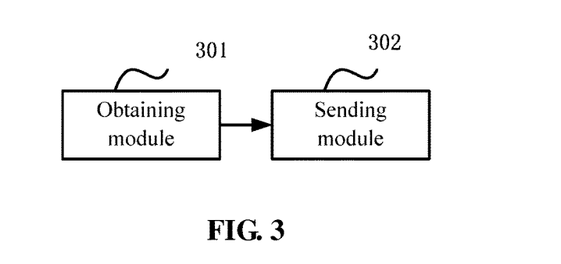
FIG. 3 is a structure composition diagram of a mobility management device according to some embodiments of the disclosure.

In some embodiments of the disclosure, at a network side, a mobility management device is provided. As shown in FIG. 3, the mobility management device includes an obtaining module 301 and a sending module 302.

The obtaining module 301 is configured to obtain a pre-configured Cell specific minimum receiving level value Qrxlevmin-offset of each neighbor cell.

The sending module 302 is configured to broadcast the pre-configured Cell specific minimum receiving level value Qrxlevmin-offset of each neighbor cell.

In the technical solution provided in the above-mentioned embodiments of the disclosure, in idle mode mobility management, an accurate target cell is obtained according to a frequency specific minimum receiving level value Qrxlevmin configured for each cell, a Cell specific minimum receiving level value Qrxlevmin-offset pre-configured for each cell and a measured signal level value of each neighbor cell in a cell selection process, thus avoiding the problem that a terminal makes ping-pong reselection during cell reselection or the reselection speed is low.

Figure 4:
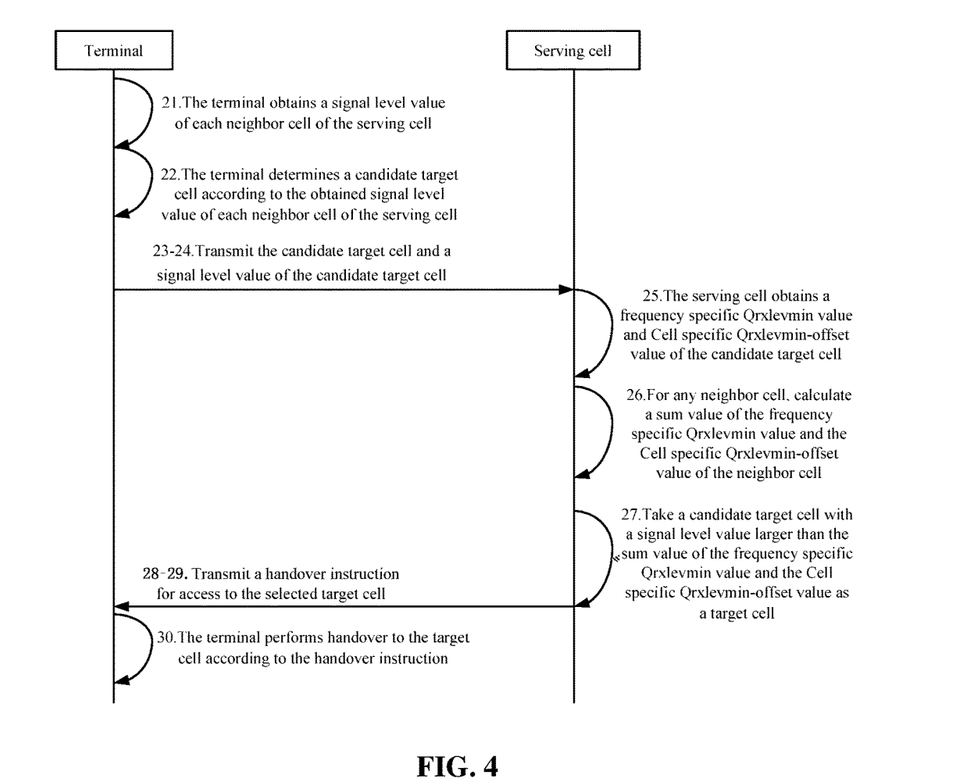
FIG. 4 is a flowchart of a mobility management method according to some embodiments of the disclosure.

In connected mode mobility management of the related art, a target cell is determined only on the basis of a signal level value of a current serving cell reported by the terminal, a signal level of a neighbor cell measured by the terminal, and resources of the neighbor cell. In this manner, the target cell selected by the network side cannot totally ensure that the terminal can normally complete random access and other uplink flows after the access. Therefore, the effectiveness of cell selection is poor. Some embodiments of the disclosure provide a mobility management method. As shown in FIG. 4, a specific flow thereof is as follows.

In Step 21, a terminal obtains a signal level value of each neighbor cell of a serving cell.

Herein, the terminal may measure a configured measurement object, and determine the signal level value of each neighbor cell.

Each neighbor cell of the serving cell may be configured with a measurement object.

For example, in an LTE communication system, the measurement object may be a frequency, and the terminal may measure the signal level value of each neighbor cell in an overlapped coverage region or switching band on the basis of the configured measurement object.

In Step 22, the terminal determines a candidate target cell according to the obtained signal level value of each neighbor cell of the serving cell.

In Step 23, the terminal reports a measurement result of the candidate target cell, the measurement result of the candidate target cell at least including a signal level value of the candidate target cell.

In Step 24, the serving cell receives the signal level value of the candidate target cell from the terminal.

In Step 25, the serving cell obtains a frequency specific minimum receiving level value Qrxlevmin of the candidate target cell, and a pre-configured Cell specific minimum receiving level value Qrxlevmin-offset of the candidate target cell.

Herein, in the technical solution provided in the embodiments of the disclosure, the Cell specific minimum receiving level value Qrxlevmin-offset is introduced. The Cell specific minimum receiving level value Qrxlevmin-offset is pre-configured for each cell. Specifically, the following program may be used to implement the technical solution:

```
IntraFreqNeighCellInfo ::=      SEQUENCE {
    physCellId                      PhysCellId,
    q-OffsetCell                    Q-OffsetRange,
    q-RxLevMin-OffsetCell           Q-RxLevMin
    ...
}
```

The serving cell may obtain the frequency specific minimum receiving level value Qrxlevmin and Cell specific minimum receiving level value Qrxlevmin-offset of the candidate target cell in the following two manners.

First manner: a frequency specific minimum receiving level value Qrxlevmin and Cell specific minimum receiving level value Qrxlevmin-offset of each neighbor cell are obtained by interaction with the neighbor cells.

Second manner: the serving cell may store frequency specific minimum receiving level value Qrxlevmins and Cell specific minimum receiving level value Qrxlevmin-offsets of other neighbor cells, and the frequency specific minimum receiving level value Qrxlevmin and Cell specific minimum receiving level value Qrxlevmin-offset of the serving cell per se.

In Step 26, a sum value of the frequency specific minimum receiving level value Qrxlevmin and the Cell specific minimum receiving level value Qrxlevmin-offset of any neighbor cell is calculated.

In Step 27, a candidate target cell with a signal level value larger than the sum value of the frequency specific minimum receiving level value Qrxlevmin and the Cell specific minimum receiving level value Qrxlevmin-offset is taken as a target cell.

In Step 28, a handover instruction for access to the selected target cell is sent to the terminal.

In Step 29, the terminal receives the handover instruction for handover to the target cell.

Herein, the target cell is determined by the serving cell according to a sum value of a reported signal level value of the candidate target cell, and a pre-configured frequency specific minimum receiving level value Qrxlevmin and Cell specific minimum receiving level value Qrxlevmin-offset of the candidate target cell.

In Step 30, the terminal performs handover to the target cell according to the handover instruction.

In some embodiments of the disclosure, at a network side, a mobility management method is provided, which includes the steps as follows.

In Step 1, a signal level value of a candidate target cell is received from a terminal.

In Step 2, a frequency specific minimum receiving level value Qrxlevmin of the candidate target cell and a pre-configured Cell specific minimum receiving level value Qrxlevmin-offset of the candidate target cell are obtained.

Herein, the pre-configured Cell specific minimum receiving level value Qrxlevmin-offset of the candidate target cell may be obtained by interaction with the neighbor cells; or the pre-configured Cell specific minimum receiving level value Qrxlevmin-offset of the candidate target cell is obtained in pre-stored pre-configured Cell specific minimum receiving level values Qrxlevmin-offset of the neighbor cells.

In Step 3, a sum value of the frequency specific minimum receiving level value Qrxlevmin and the Cell specific minimum receiving level value Qrxlevmin-offset of any neighbor cell is calculated.

In Step 4, a candidate target cell with a signal level value larger than the sum value of the frequency specific minimum receiving level value Qrxlevmin and the Cell specific minimum receiving level value Qrxlevmin-offset is taken as a target cell.

Optionally, after Step 4, the method may further include: sending, to the terminal, a handover instruction for handover to the selected target cell.

Figure 5:
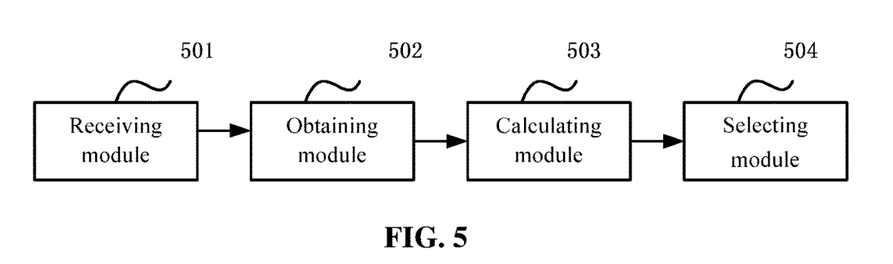
FIG. 5 is a structure composition diagram of a mobility management device according to some embodiments of the disclosure.

In some embodiments of the disclosure, at a network side, a mobility management device is provided. As shown in FIG. 5, the mobility management device includes a receiving module 501, an obtaining module 502, a calculating module 503 and a selecting module 504.

The receiving module 501 is configured to receive a signal level value of a candidate target cell from a terminal.

The obtaining module 502 is configured to obtain a frequency specific minimum receiving level value Qrxlevmin of the candidate target cell and a pre-configured Cell specific minimum receiving level value Qrxlevmin-offset of the candidate target cell.

The obtaining module 502 is specifically configured to: obtain a pre-configured Cell specific minimum receiving level value Qrxlevmin-offset of the candidate target cell by interaction with the neighbor cells; or obtain a pre-configured Cell specific minimum receiving level value Qrxlevmin-offset of the candidate target cell in pre-stored Cell specific minimum receiving level value Qrxlevmin-offsets pre-configured for a neighbor cell.

The calculating module 503 is configured to calculate a sum value of the frequency specific minimum receiving level value Qrxlevmin and the Cell specific minimum receiving level value Qrxlevmin-offset of any candidate target cell.

The selecting module 504 is configured to take a candidate target cell with a signal level value larger than the sum value of the frequency specific minimum receiving level value Qrxlevmin and the Cell specific minimum receiving level value Qrxlevmin-offset as a target cell.

Optionally, the device further includes:

a sending module, configured to send, to the terminal, a handover instruction for handover to the selected target cell.

In some embodiments of the disclosure, at a terminal side, a mobility management method is provided, which includes the steps as follows.

In Step 1, a candidate target cell is determined according to an obtained signal level value of each neighbor cell of a serving cell.

In Step 2, a measurement result of the candidate target cell is reported.

In Step 3, a handover instruction for handover to the target cell is received,

The target cell is determined by the serving cell according to a sum value of a reported signal level value of the candidate target cell, and a pre-configured frequency specific minimum receiving level value Qrxlevmin and Cell specific minimum receiving level value Qrxlevmin-offset of the candidate target cell.

In Step 4, handover to the target cell is performed according to the handover instruction.

Figure 6:
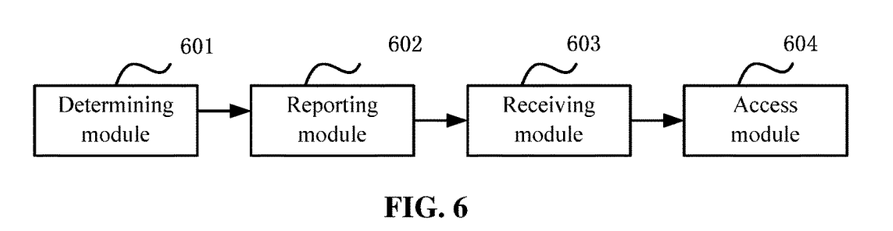
FIG. 6 is a structure composition diagram of a mobility management device according to some embodiments of the disclosure.

In some embodiments of the disclosure, at a terminal side, a mobility management device is provided. As shown in FIG. 6, the mobility management device includes a determining module 601, a reporting module 602, a receiving module 603 and an access module 604.

The determining module 601 is configured to determine a candidate target cell according to an obtained signal level value of each neighbor cell of a serving cell.

The determining module 601 is specifically configured to measure a measurement object configured for each neighbor cell of the serving cell, and determine a signal level value of each neighbor cell of the serving cell;

The reporting module 602 is configured to report a measurement result of the candidate target cell, the measurement result including a signal level value of a target cell;

The receiving module 603 is configured to receive a handover instruction for handover to the target cell, the target cell being determined by the serving cell according to a sum value of a reported signal level value of the candidate target cell, and a pre-configured frequency specific minimum receiving level value Qrxlevmin and Cell specific minimum receiving level value Qrxlevmin-offset of the candidate target cell.

The access module 604 is configured to perform handover to the target cell according to the handover instruction.

In the technical solution provided in the above-mentioned embodiments of the disclosure, in connected mode mobility management, an accurate target cell is obtained according to a frequency specific minimum receiving level value Qrxlevmin configured for each cell, a pre-configured Cell specific minimum receiving level value Qrxlevmin-offset and a measured signal level value of each neighbor cell in a cell selection process, so that a target cell selected by the network side can ensure that the terminal can normally complete random access and other uplink flows after the access, thus improving the effectiveness of cell selection.

Those skilled in the art should understand that the embodiments of the disclosure may be provided as a method, a device (equipment) or a computer program product. Thus, forms of complete hardware embodiments, complete software embodiments or embodiments integrating software and hardware may be adopted in the disclosure. Moreover, a form of the computer program product implemented on one or more computer available storage media (including, but are not limited to, a disk memory, an optical memory and the like) containing computer available program codes may be adopted in the disclosure.

The disclosure is described with reference to flowcharts and/or block diagrams of the method, the device (equipment) and the computer program product according to the embodiments of the disclosure. It will be appreciated that each flow and/or block in the flowcharts and/or the block diagrams and a combination of the flows and/or the blocks in the flowcharts and/or the block diagrams may be implemented by computer program instructions. These computer program instructions may be provided for a general computer, a dedicated computer, an embedded processor or processors of other programmable data processing equipment to generate a machine, such that a device for implementing functions designated in one or more flows of the flowcharts and/or one or more blocks of the block diagrams is generated via instructions executed by the computers or the processors of the other programmable data processing equipment.

These computer program instructions may also be stored in a computer readable memory capable of guiding the computers or the other programmable data processing equipment to work in a specific mode, such that a manufactured product including an instruction device is generated via the instructions stored in the computer readable memory, and the instruction device implements the functions designated in one or more flows of the flowcharts and/or one or more blocks of the block diagrams.

These computer program instructions may also be loaded to the computers or the other programmable data processing equipment, such that processing implemented by the computers is generated by executing a series of operation steps on the computers or the other programmable equipment, and therefore the instructions executed on the computers or the other programmable equipment provide a step of implementing the functions designated in one or more flows of the flowcharts and/or one or more blocks of the block diagrams.

Although the preferable embodiments of the disclosure have been described, once learning of a basic creative concept, those skilled in the art can make additional changes and modifications to these embodiments. Furthermore, these parameters mentioned in the technical solution of the disclosure, such as a frequency specific minimum receiving level value Qrxlevmin of a neighbor cell, a Cell specific minimum receiving level value Qrxlevmin-offset and a signal level value or signal intensity value of the neighbor cell, are not limited thereto, and can also be replaced with dependent variables relative to the above-mentioned parameters which are taken as independent variables, equivalent parameters of the above-mentioned parameters, or variations of the above-mentioned parameters. Therefore, the appended claims are intended to be interpreted as preferable embodiments and all changes, modifications and equivalent implementation manners falling within the scope of the disclosure.

Of course, those skilled in the art can make various modifications and variations to the disclosure without departing from the scope of the disclosure. Thus, if these modifications and variations of the disclosure fall within the scope of the claims of the disclosure and equivalent technologies thereof, the disclosure is also intended to include these modifications and variations.

The invention claimed is:

1. A mobility management method, wherein the mobility management method is used in an idle mode, comprising:
obtaining, by a terminal from a message broadcast by a network side device, a frequency specific minimum receiving level value Qrxlevmin of each neighbor cell of a serving cell and a pre-configured Cell specific minimum receiving level value Qrxlevmin-offset of the neighbor cell, wherein the terminal currently camps on the serving cell, wherein the pre-configured Cell specific minimum receiving level value Qrxlevmin-offset of the neighbor cell is sourced from the neighbor cell;
measuring a frequency indicated by the message broadcast by the network side device;
determining the signal level value of the neighbor cell according to the frequency;
calculating, by the terminal, a sum value of the frequency specific minimum receiving level value Qrxlevmin and the Cell specific minimum receiving level value Qrxlevmin-offset of any neighbor cell; and
taking, by the terminal, a cell with a signal level value larger than the sum value of the frequency specific minimum receiving level value Qrxlevmin and the Cell specific minimum receiving level value Qrxlevmin-offset as a candidate target cell.

2. The method according to claim 1, further comprising:
broadcasting, by a network side device, a pre-configured Cell specific minimum receiving level value Qrxlevmin-offset of a neighbor cell to a terminal.

3. The method according to claim 1, wherein the pre-configured Cell specific minimum receiving level value Qrxlevmin-offset of the neighbor cell is sourced from the neighbor cell comprises:
the pre-configured Cell specific minimum receiving level value Qrxlevmin-offset of the neighbor cell is sourced from information of the neighbor cell.

4. A mobility management method, executed by a network side device for mobility management of a terminal currently served by a serving cell, wherein the mobility management method is used in a connected mode, the method comprising:
receiving a signal level value of a candidate target cell from the terminal;
obtaining a frequency specific minimum receiving level value Qrxlevmin of the candidate target cell and a pre-configured Cell specific minimum receiving level value Qrxlevmin-offset of the candidate target cell, wherein the pre-configured Cell specific minimum receiving level value Qrxlevmin-offset of the neighbor cell is sourced from the neighbor cell;
calculating a sum value of the frequency specific minimum receiving level value Qrxlevmin and the Cell specific minimum receiving level value Qrxlevmin-offset of any candidate target cell;
selecting a candidate target cell with a signal level value larger than the sum value of the frequency specific minimum receiving level value Qrxlevmin and the Cell specific minimum receiving level value Qrxlevmin-offset as a target cell; and
sending, to the terminal, a handover instruction for handover to the selected target cell.

5. The method according to claim 4, wherein obtaining a pre-configured Cell specific minimum receiving level value Qrxlevmin-offset of the candidate target cell comprises:
obtaining the pre-configured Cell specific minimum receiving level value Qrxlevmin-offset of the candidate target cell by interaction with the neighbor cells; or
obtaining the pre-configured Cell specific minimum receiving level value Qrxlevmin-offset of the candidate target cell in pre-stored pre-configured Cell specific minimum receiving level values Qrxlevmin-offsets of the neighbor cells.

6. The method according to claim 4, wherein the pre-configured Cell specific minimum receiving level value Qrxlevmin-offset of the neighbor cell is sourced from the neighbor cell comprises:
the pre-configured Cell specific minimum receiving level value Qrxlevmin-offset of the neighbor cell is sourced from information of the neighbor cell.

* * * * *